Oct. 25, 1927.  
F. JOST  
1,646,913  
APPARATUS FOR MIXING FLUIDS OF DIFFERENT DENSITIES  
Original Filed Nov. 19, 1923
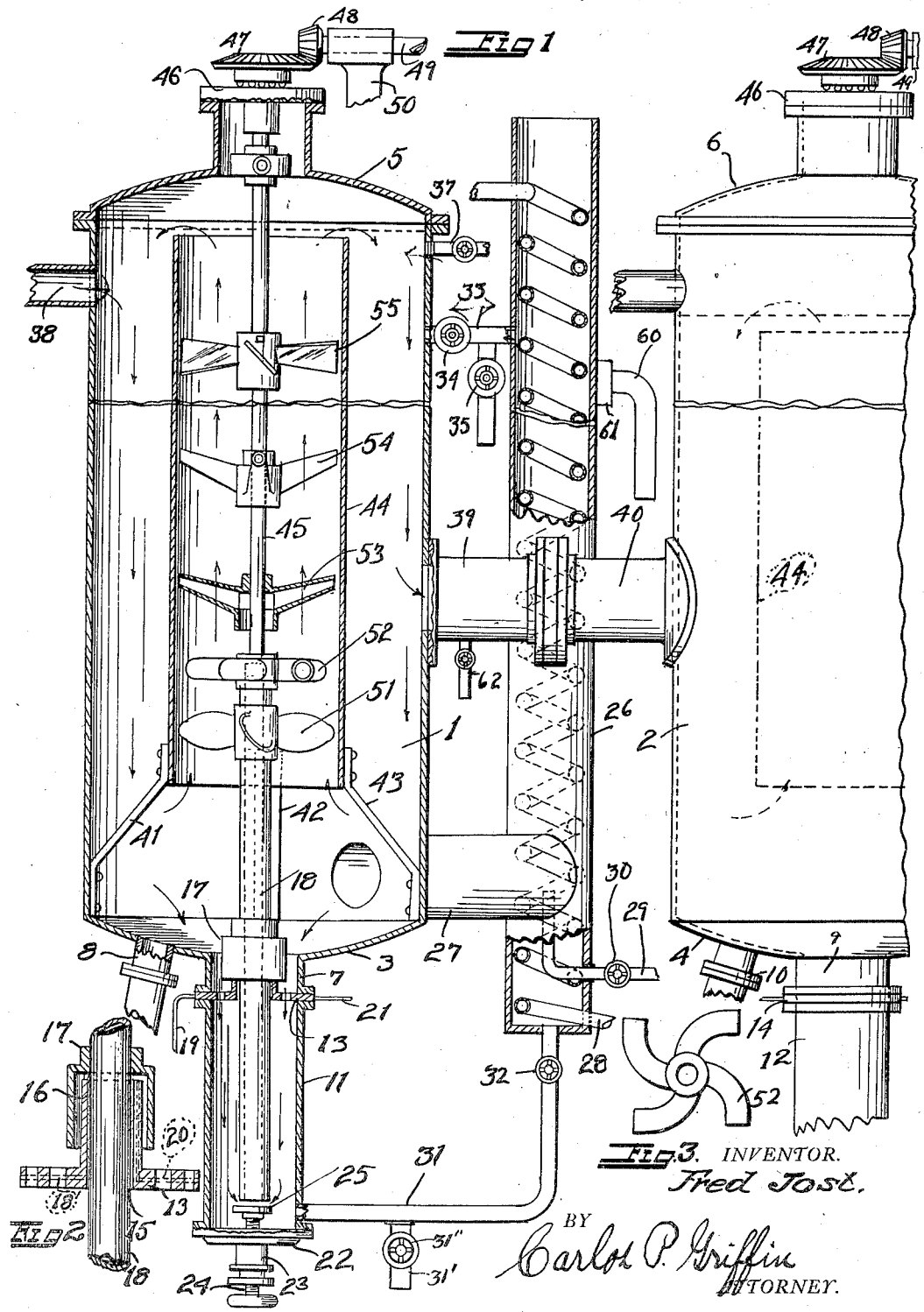
INVENTOR.  
Fred Jost.  
BY Carlos P. Griffin  
ATTORNEY.

Patented Oct. 25, 1927

1,646,913

UNITED STATES PATENT OFFICE.

FRED JOST, OF SAN FRANCISCO, CALIFORNIA.

APPARATUS FOR MIXING FLUIDS OF DIFFERENT DENSITIES.

Application filed November 19, 1923, Serial No. 675,586. Renewed April 11, 1927.

This invention relates to a process and an apparatus for treating liquids of different specific gravities, the one with the other, in a continuous circuit, and an object of the invention is to provide means whereby the heavier liquid will be retained in one of the treatment receptacles along with the sludge produced, if any, from which the treated liquid will be delivered to another treatment receptacle.

Another object of the invention is to provide means whereby the two liquids may be mixed together in an ascending current, which travels rapidly, followed by continued action in a slower moving descending current wherein the heavier liquid is separated out of the solution by gravity and is returned to the heavier liquid supply to be again placed in circulation by mechanical means.

Another object of the invention is to provide convenient means whereby the quantity of the heavier liquid mixed with the lighter liquid may be easily regulated from the outside of the apparatus.

Another object of the invention is to provide means whereby the rapidly moving column of liquid may have its particles effectually mixed during its progress through the mixing channel thereby insuring the bringing of all of the particles of each liquid into intimate contact to effect the desired result whether chemical or merely mechanical.

Another object of the invention is to provide means whereby whatever sludge is given off from the apparatus may be removed therefrom directly or with the aid of a suitable treatment column in which the sludge may be treated with heat from a steam coil to insure the separation therefrom of any occluded liquid either of the lighter type used or of the heavier type, which latter is supposed to collect in the bottom of the apparatus.

Another object of the invention is to provide means whereby the sludge may be treated either with steam or air to aid in separating from it the liquids which it is contemplated should be retained in the apparatus.

Since it often occurs that acid, such as sulphuric acid, is the heavy liquid used in such treating apparatus, as is herein described, a further object is to provide means whereby one of the immersed bearings used in the apparatus will be protected from the acid and will have a sufficient supply of oil to cause it to run properly and without undue friction.

Another object of the invention is to provide means whereby the fluid may be violently agitated and yet, at the same time, come to rest quickly and pass from one part of the apparatus to the other slowly, thereby enabling the heavy liquid to easily separate out with the minimum of the heavy liquid being carried from one treatment receptacle to another.

Another object of the invention is to mix the heavy liquid with the lighter one in a self-contained apparatus, which can handle the heavier liquid without using outside pumps, and with no complicated stuffing boxes, the treated liquid passing in a continuous stream from one liquid receptacle to the next one of the series.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a vertical sectional view of one of the treatment towers, a portion of the sludge removing stack also being shown in section, and a portion of the second treatment tower substantially identical with the first being shown connected to the first tower, Fig. 2 is a vertical sectional view of the bearing used in the bottom of the treatment tower, Fig. 3 is a plan view showing the shape of one of the tubular pumping impellers.

It will be understood by those skilled in the art, such for example, as oil refining, although this apparatus and the process herein described is not limited to that particular field, that a plurality of towers such as are here indicated are ordinarily used in conjunction with each other so that the fluids treated are several times brought into contact with the desired reagents.

In the present instance only two towers are shown, as indicated at 1 and 2, and they consist of cylindrical vessels of considerable height having the round bottoms 3 and 4 with the flanged tops 5 and 6 for closing them at the top. Each rounded bottom has a pipe connection 7, 8, 9, 10. Short pipes 11 and 12 are connected to the pipes 7 and 9 with the bearing spider 13 and 14 between the flanges of the two sets of pipes. The bearing spider 13 has a chamber 15 formed at its center, and at the top of this chamber there is the bearing proper 16. This bearing is covered by means of the hood 17 which is secured to the agitator shaft 18.

The bearing spider 13 has hole 18' therein to which the oil supply pipe 19 is connected and it also has a hole 20 therein to which the oil delivery pipe 21 is connected, the hole 20 extending through the spider and up into the space covered by the hood 17.

In operation the oil is supplied to the apparatus by the pipe 19 and as it is lighter than the fluid used in the bottom of the treatment apparatus, it will flow upwardly in the retaining pocket formed by the bearing 16. As it works through the bearing it will collect under the hood 17, and if necessary be removed from time to time through the pipe 21, or the hood may be supplied with oil from that pipe, if it appears necessary.

The pipe 11 is closed by means of the flanged plate 22 secured to the bottom thereof, and this plate carries a packing gland 23. Extending through the packing gland 23 is a threaded rod 24 with a plate 25 on its upper end and by adjusting the position of the plate 25 with respect to the bottom of the tubular shaft 18, the quantity of the heavier liquid passing thereinto may be regulated at will.

At the side of the receptacle 1 there is a sludge pipe 26 which is connected to the receptacle 1 by means of the horizontally extending pipe 27. This sludge pipe may be heated by the coil therein with steam supplied thereto through the pipe 28, and live steam or air may be used to agitate the sludge as supplied thereto by the pipe 29 regulated by means of the valve 30.

In order to allow the liquid within the pipe 26 to pass into pipe 11, the pipe 31 is provided, and it has a valve 32. This allows any of the heavy liquid collected in the bottom of the pipe 26 to pass back into the supply. Another pipe 33, with a supply valve 34 and discharge valve 35 enables the operator to allow access of the fluid in the top of the tank 1 to the top of the pipe 26 or vice versa, whenever that may become necessary. The tank 1 is also provided with the inlet pipe 37 and an inlet pipe 38 to supply it such fluids as it may be desired to use therein, and the two tanks 1 and 2 are connected together by means of two short lengths of pipe 39, 40, which continuously take away some of the lighter liquid.

Supported upon suitable legs 41, 42, and 43, within the tank 1, is an open cylindrical shell 44 into which the tubular shaft 18 extends and which shaft is connected to the solid shaft 45 which extends through a bearing 46 at the top of the cover 5. The shaft 45 has a bevel gear 47 which is in mesh with a small bevel gear 48 on a drive shaft 49, the latter shaft being journalled in a bearing 50 suitably supported from any fixed part of the apparatus.

Mounted on tubular shaft 18 is a screw propeller 51, and at the top of the tubular shaft 18 there is a tubular impeller 52. Mounted on the shaft 45 above the tubular impeller 52 there are two tubular impellers 53, 54 which impellers serve to draw the fluid from the center of the shell 42 and discharge it against the periphery thereof, thereby insuring a complete mixing of the fluids used, and above the impeller 54 there is a screw propeller 55 to further aid in mixing and raising the fluids to discharge them over the top of the shell 44.

It will be seen that if the diameter of the shell 44 is equal to the radius of the tank 1, or less, that the materials will descend outside of the shell very much slower than they will be lifted through said shell 44, thereby giving the descending current of materials ample opportunity to permit the heavy fluid used to settle at the bottom of the tank 1 and thereby be again mixed with the heavy fluid collecting in the pipe 11 from which it is drawn by the impeller 52 at a rate determined by the position of the regulation valve 25.

In order to provide for draining the receptacle 11, the pipe 31 may have a discharge 31' controlled by a suitable valve 31". The discharge of sludge from the pipe 26 is regulated by an elbow 60 which is connected to a fitting 61 secured on the side of the pipe 26 at the proper level and the elevation of the discharge is determined by rotating the elbow 60 to the desired height, the height being ordinarily something between the elevation of the fixture 61 and the level of the liquid in the tank 1.

It will also be noted that the level of the liquid in the tank 1 will be close to the top of the pipe 44, while the level of the liquid in the tank 2 is somewhat lower than that and the pipe 44 in that tank is correspondingly lower than the top of the pipe 44 in the tank 1.

It will, of course, be understood by those skilled in the art that it is necessary to make the parts of this apparatus of suitable materials to withstand the action of various chemicals, since both strong acids and strong alkalis are often used which would disintegrate ordinary tanks or receptacles.

The operation of the apparatus is as follows:

In the case of the treatment of oil with sulphuric acid, which may be considered to be typical of a series of treatments capable of being carried out in this apparatus, the lower portion of the receptacle is filled to about the level of the spider 13 with strong acid. The remainder of the receptacle is then filled to a short distance above the level of the pipe 44 with oil, gasoline or distillate, whichever it may be desired to treat.

The shaft 45 is then rotated, and as it is rotated the propellers 51 and 52 will cause the oil to rapidly travel upwardly through the pipe 44, at the same time the impeller 52 will cause the discharge therefrom into the oil passing through the pipe 44 of a quantity of the heavy acid collected in the pipe 11.

The quantity of acid discharged by the impeller 52 will be determined by the position of the valve 25, said valve being regulated to discharge much or little of the acid as the treatment process may demand. At the same time the impellers 53, 54 will draw the liquid from the center of the pipe 44 to the outside of the same thereby effectually mixing it, and as it is discharged over the top of the pipe 44, it will flow to the bottom of the receptacle 1.

As the mixed fluids leave the top of the pipe 44 they will flow outwardly and then downwardly. Since the area of the tank 1 outside the pipe 44 is much greater than the area of said pipe, the rate of flow of the fluids downwardly will be considerably decreased, but nevertheless there will be a tendency for the heaviest liquid to continue straight down rather than moving laterally. This will cause most of the heavy liquid to continue to the bottom of the cylinder 11 while some of the lighter liquid will pass through the pipes 39 and 40 to the next tank and the sludge which is lighter than the heavy liquid will tend to pass through the pipe 27 to be treated by the steam coil 28. The pipe 8 is also used whenever necessary to discharge the sludge. Whatever sludge passes into the pipe 26 will be heated and the heating will cause it to separate more perfectly from the oil and acid, thereby enabling a better recovery of the useful oil to be made.

The steam pipe 29 supplies a certain amount of steam to the sludge being heated in the pipe 26 and this discharge causes the sludge to work upwardly in said pipe and finally be discharged therefrom at the top by the elbow pipe 86; said pipe being turned to any desired angle to regulate the flow therefrom.

These towers are usually placed in batteries of two or more, and the operations are repeated as often as may be necessary with any particular liquid to be treated.

In order to sample the liquid as it passes from one tower to another, the pipe 39 may be provided with a test valve 62.

What I claim is as follows, but modifications may be made in carrying out the invention shown in the drawings and described process within the purview of the appended claims.

1. In a mixing apparatus, the combination with a fluid receptacle, of supply and discharge pipes connected thereto, a cylindrical shell within the receptacle, rotary agitators within said shell, means connected with said agitators for drawing liquid from the bottom of the receptacle upwardly and discharging it into said shell the shell being spaced from the bottom of the receptacle whereby liquid may be moved therethrough from two different levels and a valve to regulate the quantity of liquid supplied to the agitators from the bottom of the receptacle.

2. In a mixing apparatus, the combination with a fluid receptacle, of supply and discharge pipes connected thereto, a cylindrical shell within the receptacle supported with its lower and upper ends at a distance from the bottom and top of said receptacle respectively, a shaft extending through the cylindrical shell the lower portion of which is tubular and which terminates close to the bottom of the receptacle, pumping impellers on said shaft adapted to draw liquid through the tubular shaft and elevate the liquid within said shell whereby the materials within the receptacle may be effectually mixed.

3. In a mixing apparatus, the combination with a fluid receptacle of supply and discharge pipes connected thereto, an open cylindrical shell supported within the receptacle with its ends at a distance from the top and bottom of the receptacle respectively, a revoluble shaft the lower end of which is tubular, extending into the receptacle through said shell, impellers upon said shaft to elevate the liquid in the receptacle through said shell, a pump impeller on said shaft arranged to draw liquid from the bottom of the receptacle through the tubular shaft, means outside the receptacle to regulate the quantity of material elevated through the tubular shaft and a sludge discharge pipe connected to the receptacle adjacent its lower portion.

4. In a mixing apparatus, the combination with a fluid receptacle of supply and discharge pipes connected therewith, means to raise a quantity of liquid from the bottom of the receptacle, means to mix the liquid so raised with an additional quantity of liquid taken from an intermediate level in the receptacle, means to regulate a quantity of fluid taken from the bottom of the receptacle, a discharge pipe for the mixed fluid terminating below the top of the receptacle whereby a continuous circulation of the liquid may be produced, a sludge pipe at the side of the liquid receptacle connected thereto at a point above the bottom of the receptacle and means within said sludge pipe to purify, elevate and discharge said sludge.

In testimony whereof I have hereunto set my hand this 10th day of November, A. D. 1923.

FRED JOST.